United States Patent
Delahaye et al.

(10) Patent No.: US 8,899,521 B2
(45) Date of Patent: Dec. 2, 2014

(54) AIRCRAFT FLOOR OF OPTIMIZED COMPACTNESS AND HOUSING UTILITY MEMBERS

(75) Inventors: Romain Delahaye, Colomiers (FR); Guillaume Gallant, Lareole (FR); Olivier Eve, Mondonville (FR)

(73) Assignee: Airbus Operations, Toulouse (FR)

( * ) Notice: Subject to any disclaimer, the term of this patent is extended or adjusted under 35 U.S.C. 154(b) by 622 days.

(21) Appl. No.: 12/823,376

(22) Filed: Jun. 25, 2010

(65) Prior Publication Data
US 2011/0001008 A1    Jan. 6, 2011

(30) Foreign Application Priority Data
Jul. 2, 2009 (FR) ..................... 09 54559

(51) Int. Cl.
*B64C 1/00* (2006.01)
*B64C 1/18* (2006.01)

(52) U.S. Cl.
CPC ........................ *B64C 1/18* (2013.01)
USPC ........................ 244/119; 244/118.1

(58) Field of Classification Search
USPC ........ 52/783.1, 783.14, 783.18, 791.1, 793.1, 52/220.1, 220.3, 220.4, 177, 650.3; 244/118.1, 199, 117 R, 131, 119
See application file for complete search history.

(56) References Cited

U.S. PATENT DOCUMENTS

| | | | |
|---|---|---|---|
| 2,412,778 A * | 12/1946 | Kosek | 244/120 |
| 4,185,799 A * | 1/1980 | Richards, Jr. | 244/118.5 |
| 4,338,484 A * | 7/1982 | Littrell | 174/482 |
| 4,479,621 A * | 10/1984 | Bergholz | 244/117 R |
| 4,989,809 A * | 2/1991 | Arnold | 244/137.1 |
| 5,086,996 A * | 2/1992 | Roeder et al. | 244/119 |
| 5,263,289 A * | 11/1993 | Boyd | 52/220.2 |
| 5,752,673 A * | 5/1998 | Schliwa et al. | 244/118.6 |
| 5,890,768 A * | 4/1999 | Beurteaux et al. | 297/463.1 |
| 6,467,118 B2 * | 10/2002 | Dumlao et al. | 14/73 |
| 6,517,028 B2 * | 2/2003 | Huber | 244/137.1 |
| 6,536,710 B1 * | 3/2003 | Bobzien et al. | 244/119 |
| 6,572,054 B1 * | 6/2003 | Smallhorn | 244/119 |
| 6,585,189 B1 * | 7/2003 | Smallhorn | 244/118.5 |
| 6,659,402 B1 * | 12/2003 | Prochaska | 244/118.6 |
| 6,824,104 B2 * | 11/2004 | Smallhorn | 244/118.5 |
| 7,393,488 B2 * | 7/2008 | Grose et al. | 264/254 |
| 7,721,992 B2 * | 5/2010 | Keeler et al. | 244/119 |
| 8,074,928 B2 * | 12/2011 | Haack et al. | 244/119 |
| 8,157,210 B2 * | 4/2012 | Huber et al. | 244/118.2 |

(Continued)

FOREIGN PATENT DOCUMENTS

| | | |
|---|---|---|
| EP | 0 408 432 A1 | 1/1991 |
| EP | 1 614 624 A1 | 1/2006 |

(Continued)

OTHER PUBLICATIONS

French Preliminary Search Report issued in French Patent Application No. 0954559; search completed Mar. 1, 2010 (with English-language translation).

*Primary Examiner* — Tien Dinh
*Assistant Examiner* — Michael A Fabula
(74) *Attorney, Agent, or Firm* — Oliff PLC (57) ABSTRACT

An aircraft floor portion includes crossmembers. Each crossmember comprises a top partial crossmember and a bottom crossmember, with at least one gap being left between the top partial crossmember and the bottom partial crossmember of each crossmember.

14 Claims, 5 Drawing Sheets

(56) References Cited

U.S. PATENT DOCUMENTS

| | | | |
|---|---|---|---|
| 8,167,231 B2 * | 5/2012 | Leisten et al. | 244/1 A |
| 8,205,832 B2 * | 6/2012 | Schroeer et al. | 244/119 |
| 2003/0106962 A1 * | 6/2003 | Smallhorn | 244/118.5 |
| 2003/0106963 A1 * | 6/2003 | Smallhorn | 244/125 |
| 2006/0202084 A1 * | 9/2006 | Smallhorn | 244/118.5 |
| 2006/0226288 A1 | 10/2006 | Vetillard et al. | |
| 2007/0007392 A1 * | 1/2007 | Huber et al. | 244/137.1 |
| 2007/0095978 A1 * | 5/2007 | Oetken et al. | 244/118.1 |
| 2007/0176048 A1 * | 8/2007 | Huber et al. | 244/119 |
| 2008/0169681 A1 * | 7/2008 | Hedderly | 296/193.07 |
| 2008/0210820 A1 * | 9/2008 | Kismarton et al. | 244/120 |
| 2009/0184199 A1 * | 7/2009 | Leisten et al. | 244/1 A |
| 2010/0044510 A1 * | 2/2010 | Schroeer et al. | 244/119 |
| 2010/0116934 A1 * | 5/2010 | Herzog et al. | 244/118.5 |
| 2010/0127123 A1 * | 5/2010 | Hoffjann et al. | 244/118.1 |
| 2010/0252684 A1 * | 10/2010 | Stephan | 244/131 |
| 2011/0001006 A1 * | 1/2011 | Delahaye et al. | 244/118.5 |
| 2011/0001008 A1 * | 1/2011 | Delahaye et al. | 244/119 |
| 2011/0036946 A1 * | 2/2011 | Depeige et al. | 244/120 |
| 2011/0155850 A1 * | 6/2011 | Noebel | 244/119 |
| 2011/0270571 A1 * | 11/2011 | Cobb et al. | 702/150 |

FOREIGN PATENT DOCUMENTS

| | | |
|---|---|---|
| GB | 2 435 251 A | 8/2007 |
| WO | WO 2007/057411 A1 | 5/2007 |
| WO | WO 2007/093321 A1 | 8/2007 |
| WO | WO 2007/141291 A1 | 12/2007 |

* cited by examiner

AIRCRAFT FLOOR OF OPTIMIZED COMPACTNESS AND HOUSING UTILITY MEMBERS

The invention relates to aircraft, and in particular to their floors.

BACKGROUND OF THE INVENTION

It is known to make an airplane floor using horizontal crossmembers that extend perpendicularly to the longitudinal direction of the fuselage. Longitudinal rails are fastened on the crossmembers, and in turn they are covered by a floor panel. The rails support the passenger seats.

Numerous systems or members generally need to be fastened to the floor. For example, these may be hydraulic or pneumatic members (compressed air or air conditioning ducts, water ducts, refrigeration ducts, oxygen ducts), electric cables, fire extinguisher circuit elements, or indeed cables of on-board communications networks. These various members are generally located under the crossmembers of the floor. A covering panel masks and protects these members relative to a cargo zone.

The drawback of that arrangement is that it occupies a considerable amount of height, thereby penalizing the height available in the cabin space above the floor or the height available in the cargo space below the floor.

OBJECT AND SUMMARY OF THE INVENTION

An object of the invention is to optimize the space available inside the aircraft.

To this end, the invention provides a portion of an airplane floor, which portion includes crossmembers, each crossmember comprising a top partial crossmember and a bottom partial crossmember, with at least one gap being left between the top partial crossmember and the bottom partial crossmember of each crossmember.

Thus, this arrangement does not significantly modify the mechanical properties of the crossmembers. In particular, each crossmember made up of top and bottom partial crossmembers presents substantially the same second moment of area as a conventional one-piece crossmember. This second moment of area comes from the relatively tall height that can be given to the crossmember made up of two partial crossmembers. In contrast, the space available between the top and bottom partial crossmembers is useful for housing members such as those mentioned above, instead of placing them under the floor. This results in more space being made free under the floor. It is thus possible to increase the volume available for a cargo zone, or on the contrary, by lowering the floor, to increase the volume available in the cabin. It is also possible to take advantage of this greater compactness to reduce the total section of the fuselage. Conversely, for unchanging compactness, it is possible to increase the total height of the crossmembers of the floor so as to enable the floor to contain systems that are more voluminous than those that have been associated with the floor in the prior art. Furthermore, systems may be put into place between the partial crossmembers before they are connected together to constitute the crossmembers. This makes it much easier to install such systems, and in particular makes installing them more ergonomic for operators.

Advantageously, for each crossmember, the partial crossmembers are connected to each other via at least two hinges.

That constitutes a simple way of fastening partial crossmembers together.

Advantageously, the floor portion includes at least one member of the aircraft received in the gap or one of the gaps and having a function other than a function relating to the floor.

With the member(s) received in this way in the gap(s), they are exposed neither to the cabin nor to the cargo zone. They are thus suitably protected from impacts and pollution from the surroundings. They do not occupy space in either of those two zones.

The invention also provides an aircraft including at least one floor portion of the invention.

Preferably, the floor portion is connected to at least one other floor portion of the aircraft, in particular by hinge means.

That constitutes a way of fastening the portions together that is simple to implement.

Advantageously, the floor portion is a middle portion, the aircraft having two lateral floor portions, distinct from the middle portion and each fastened both to the fuselage and to supports that are connected to the, fuselage. The middle portion is connected to the lateral portions.

Thus, it is possible to begin by mounting the two lateral floor portions in the fuselage and to mount the middle portion only subsequently. After the lateral portions have been mounted, it is possible immediately and without waiting for the middle portion to be installed, to assemble systems in the so-called "triangular" zones. Access thereto when the middle portion is absent is easy and relatively ergonomic. In particular, operators can remain standing while they are installing systems. Furthermore, certain systems may be mounted on the middle portion of the floor before it is brought into the fuselage so as to be fastened to the lateral portions. Once more, conditions for mounting such systems are greatly improved, so far as the operators are concerned, since the middle portion is not yet installed in the fuselage. In addition, it is possible to assemble systems on the middle portion while the triangular zones of the fuselage are receiving the systems that are associated therewith. The corresponding operations can therefore be performed in parallel, thereby enabling the overall time required to build the aircraft to be reduced. Furthermore, the invention presents the additional advantage that the middle portion, which by definition has dimensions that are smaller than the overall dimensions of the floor, may be inserted even after the top portion of the fuselage segment has been secured to the bottom portion, such that the middle portion may no longer be inserted in the fuselage from the top. Since the middle portion is of small size, it is entirely possible to introduce the middle portion through the front or rear opening of the fuselage segment. In addition, the freedom thus provided for assembling the entire fuselage segment prior to inserting the middle portion of the floor makes the method of building the aircraft even more flexible, thereby also helping shorten the overall time required for assembly.

Advantageously, the aircraft includes a fuselage with at least one row of passenger seats, the seats of the row being associated with supports that support the respective seats in full, one of the seats being adjacent to an aisle, the support for the seat adjacent to the aisle being connected to the fuselage and to the floor solely via the support for the adjacent seat in the row.

The invention also provides a method of making an aircraft floor, wherein top partial crossmembers are assembled to bottom partial crossmembers in such a manner as to form crossmembers while leaving at least one gap between the top partial crossmember and the bottom partial crossmember of each crossmember.

Preferably, prior to assembly, the top partial crossmembers or the bottom partial crossmembers are fastened to a common support.

This simplifies installing the crossmembers associated with the support. The crossmembers can be brought in a single operation.

Preferably, prior to assembly, at least one member of the airplane that has a function other than a function relating to the floor is interposed between the partial crossmembers, in particular between the top partial crossmembers and the bottom partial crossmembers.

Thus, the member(s) may be installed at this stage, prior to mounting the floor portion in the fuselage.

Advantageously, the method is implemented, and after making the assembly, the assembly is inserted into a fuselage or fuselage portion of the aircraft.

Thus, the essentially polluting operations (such as drilling holes) that are performed while making the floor portion are prevented from polluting the environment inside the fuselage. Conversely, operations performed previously on the fuselage will not pollute the floor portion.

Preferably:

two lateral floor portions are each fastened both to a fuselage element and to supports that are connected to the fuselage element; and then the assembly is brought between the lateral portions and is connected to the lateral portions.

BRIEF DESCRIPTION OF THE DRAWINGS

Other characteristics and advantages of the invention appear further from the following description of a preferred embodiment given by way of non-limiting example and with reference to the accompanying drawings, in which.

MORE DETAILED DESCRIPTION

Figure 1:
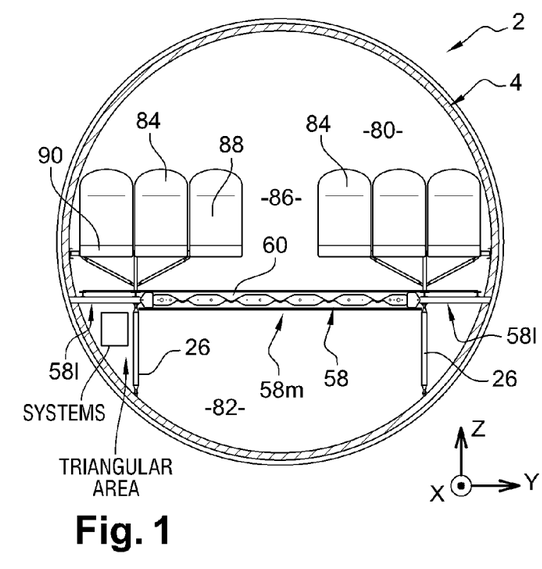
FIG. 1 is a section view of the fuselage of an airplane of the invention in a plane perpendicular to a longitudinal direction of the fuselage.

With reference to FIG. 1, the aircraft 2 of the invention in the embodiment described below is constituted by an aerodyne, and specifically an airplane. The airplane has a fuselage 4, two wings, a tail, and engines, specifically two engines fastened to the wings in this example. An X, Y, and Z frame of reference is used below in which the direction X designates the longitudinal horizontal direction of the fuselage, the direction Y designates the horizontal direction perpendicular to the direction X, and the direction Z designates the vertical direction.

Over the major fraction of its length, the fuselage presents a generally cylindrical shape of axis parallel to the direction X, and of section that is generally circular in a plane perpendicular to said direction. A segment of the fuselage is shown in FIGS. 1 to 3, 7 and 8. The description below relates to this segment, it being understood that the fuselage may comprise a plurality of segments made up in the same manner and located one after another.

The fuselage 4 comprises mutually identical frames 12. The frames 12 in this example are generally circular in shape, each extending in a vertical plane. The axes of the frames coincide with the longitudinal axis of the fuselage. The frames are mutually parallel, facing one another, and spaced apart from one another. The fuselage has a wall 14 of generally cylindrical shape fastened to the frames by means of stringers.

The segment contains a floor 58 comprising two lateral portions 58*l*, left and right portions, and a middle portion 58*m*. The middle portion 58*m* extends between the lateral portions 58*l*. The overall shape of the floor is generally that of a horizontal plane that is parallel to directions X and Y.

The middle portion 58*m* has rectilinear crossmembers 60 extending in the direction Y. The crossmembers are parallel to one another, facing one another, and spaced apart from one another. They all lie in the same horizontal plane.

Each of the lateral portions 58*l* comprises section members, constituted in this example by battens 74. The battens are arranged in a manner similar to the crossmembers 60. In particular, they thus extend along the direction Y. They are disposed in such a manner as to come into contact with the corresponding end of a respective crossmember, as described below. The outside end of each batten, to the left for the left battens shown in the figures, is rigidly fastened to the frame 12 that is situated at the same level as the batten. The floor is formed in such a manner that, each frame 12 corresponds to a crossmember 60 and to two battens 74 on the left and the right, all three extending in substantially the same plane.

The inside end of each batten is also associated with a post 26 formed by a section member extending vertically in the direction Z. The top end of the post is fastened to the post, specifically via a fitting that is rigidly fastened to the batten. Similarly, the bottom end of the post is fastened to the same frame as is already fastened to the other end of the batten. At the bottom portion, the fastening takes place via a fitting that is rigidly fastened to the frame. Each fitting is hinged to the post about an axis 27 parallel to the direction X.

There follows a detailed description of the middle portion 58*m*. Each crossmember 60 has a top partial crossmember 60*s* and a bottom partial crossmember 60*i*. Specifically, each of the partial crossmembers is a half-crossmember insofar as it constitutes substantially a bottom or a top half of the crossmember.

Figures 4, 5:
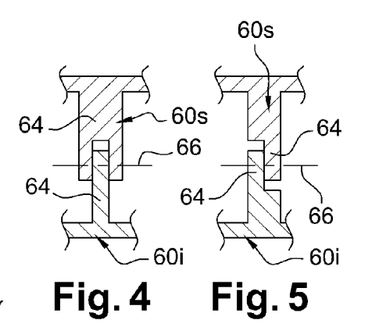
FIG. 4 is a section view on plane IV-IV of the crossmember of FIG. 2.
FIG. 5 is a view analogous to FIG. 4 showing a variant embodiment.

The bottom half-crossmember 60*i* presents a flange 67 forming its horizontal base and a vertical wall extending in a plane that is parallel to the directions Y and Z. The wall presents tongues 64 of generally triangular shape that extend it locally upwards. Specifically, there are five tongues in this example that are regularly spaced apart from one another along the half-crossmember. The top crossmember 60*s* presents an analogous arrangement with tongues 64 that extend downwards. The tongues of the top wall and of the bottom wall are located in the vicinity of one another so that their free ends overlap. In each overlap zone, one of which is shown in detail in FIG. 4, there is received a hinge pin 66 serving to fasten the top half-crossmember to the bottom half-crossmember by hinging together each pair of tongues 64. The pin extends parallel to the direction X. As shown in FIG. 4, in the present example, the tongues of the bottom partial crossmember penetrate into the hollowed-out free ends of the tongues of the top partial crossmember. Nevertheless, in a variant embodiment, as shown in FIG. 5, provision may be made for the top and bottom tongues merely to overlap in the direction X. By means of the hinge connections via the tongues between the partial crossmembers making up each crossmember, the two partial crossmembers of each crossmember are rigidly fastened together.

The partial crossmembers of each crossmember 60 define gaps 68 between consecutive pairs of tongues 64. In this example, there are six gaps 68 in each crossmember 60. Given that the crossmembers 60 are mutually identical and arranged to coincide, the gaps 68 likewise coincide from one crossmember to the next. This defines elongate housings in the direction X that are defined above by the partial crossmembers 60s and below by the partial crossmembers 60i. These housings are used to house systems or members 70 of the kind mentioned above that have functions other than a function relating to the floor. For example, they may be hydraulic or pneumatic members (compressed air or air conditioning ducts, water ducts, refrigeration ducts, oxygen ducts), electric cables, fire extinguisher circuit elements, or indeed ducts for on-board communications networks. The gaps 68 that follow one another along a crossmember may receive members of types that differ from one gap to another.

Furthermore, on each crossmember, the two partial crossmembers are fastened together at each of the crossmembers by means of a respective connection part 72 that is rigidly fastened to each of the partial crossmembers. The connection part is also hinged to the associated batten 74 about an axis 75 that is parallel to the direction X. The hinge pins between the fasteners 72 and the battens are preferably situated on the neutral axis in bending of the crossmembers 60. The same applies for the pins 66.

The floor also comprises a top panel 76 resting on the top partial crossmembers 60s. Rails 22, two rails in this example, extending parallel to the direction X, are also provided in each lateral portion 58l of the floor. Each rail rests on one or more battens. The lateral ends of the panel rest on each of the rails 22. The floor also has a bottom panel 78 fastened to the base 67 of the bottom partial crossmembers 60i. The top panel 76 forms the bottom limit of the airplane cabin 80, while the bottom panel 78 forms the top limit of the airplane cargo zone 82.

There follows a description of an implementation of the method of the invention for making and installing the airplane floor.

Figure 6A:
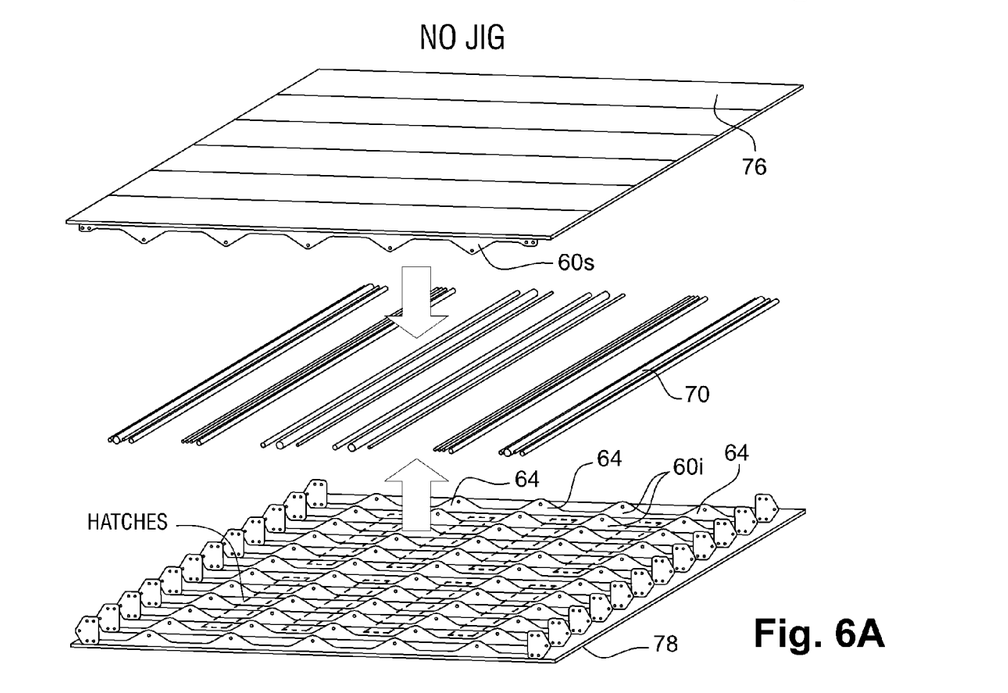
FIGS. 6A, 6B and 7 are perspective views showing how a middle portion of the floor is made and how it is inserted in the fuselage.

With reference to FIG. 6A, in order to fabricate the floor, the top partial crossmembers 60s are initially fastened to the top panel 76 in their final positions underneath it.

The bottom partial crossmembers 60i are also temporarily fastened on an assembly jig 79 in the final positions that they are to occupy relative to one another.

Thereafter, the arrangement shown in FIG. 6A is made by interposing between the members 70 that are to be housed in the gaps 68 between the subassembly of the panel 76 with the top partial crossmembers 60s on top and the subassembly of the jig 79 with the bottom partial crossmembers 60i underneath. The members 70 are also placed in the positions they are to occupy relative to one another.

Thereafter, all of these elements are moved towards one another in the vertical direction so as to form stack with the members 70 sandwiched between the two subassemblies. During this approach, the top partial crossmembers come into contact with the corresponding bottom partial crossmembers so as to form the crossmembers 60, and the gaps 68 are formed around the members 70 which are thus received therein.

The assembly jig 79 presents openings or hatches enabling one or more operators to put the hinge pins 66 into place whereby the tongues 64 of the top and bottom crossmembers are connected together. This ensures that the top partial crossmembers are rigidly fastened to the bottom partial crossmembers.

Thereafter, the bottom partial crossmembers may be separated from the jig 79 and moved away therefrom.

Thereafter, the fastener 72 are put into place and then the bottom panel 78 is put into place.

Figure 7:
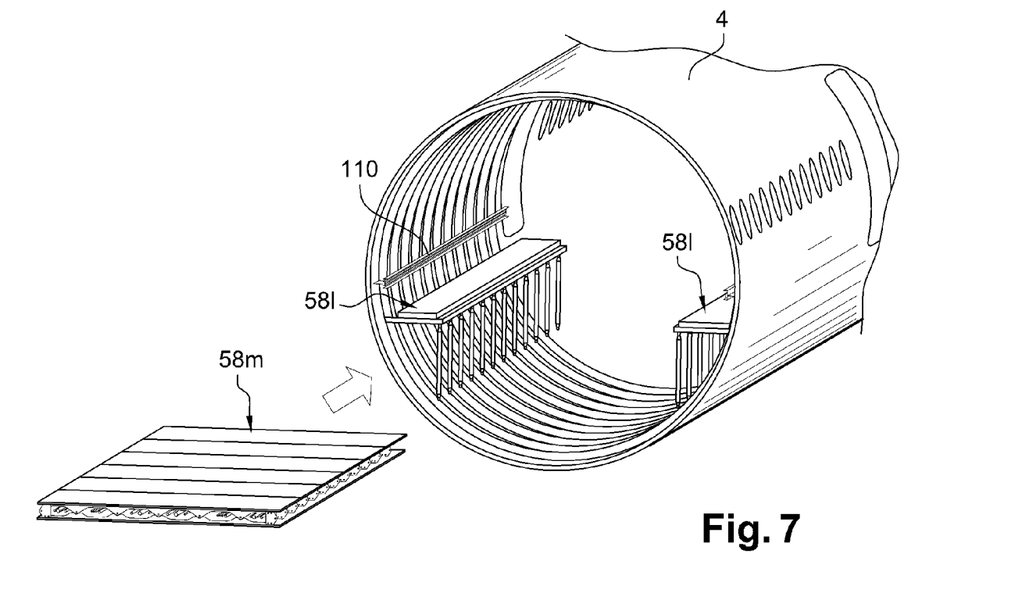

The middle portion of the floor 58m as made up in this way and as shown in FIG. 7 is then ready to be inserted into the destination fuselage segment.

Furthermore, the lateral floor portions 58l have already been mounted in this segment where they rest on the posts 26. Likewise, certain analagous systems 70 have have parts or components already put into place, in particular in the "triangular" zones defined on top by the battens 74 and laterally by the frames 12 and by the posts 26. Since the middle portion of the floor has not yet been installed at this stage, these members 70 can be put into place in a manner that is relatively comfortable for the operators.

It should be observed at this point that the middle portion of the floor 58m may be built up while the lateral portions 58l are being mounted in the fuselage and the systems 70 are being installed. These operations may therefore be performed in parallel (or simultaneously) in order to reduce the overall time taken to build the aircraft.

Figure 6B:
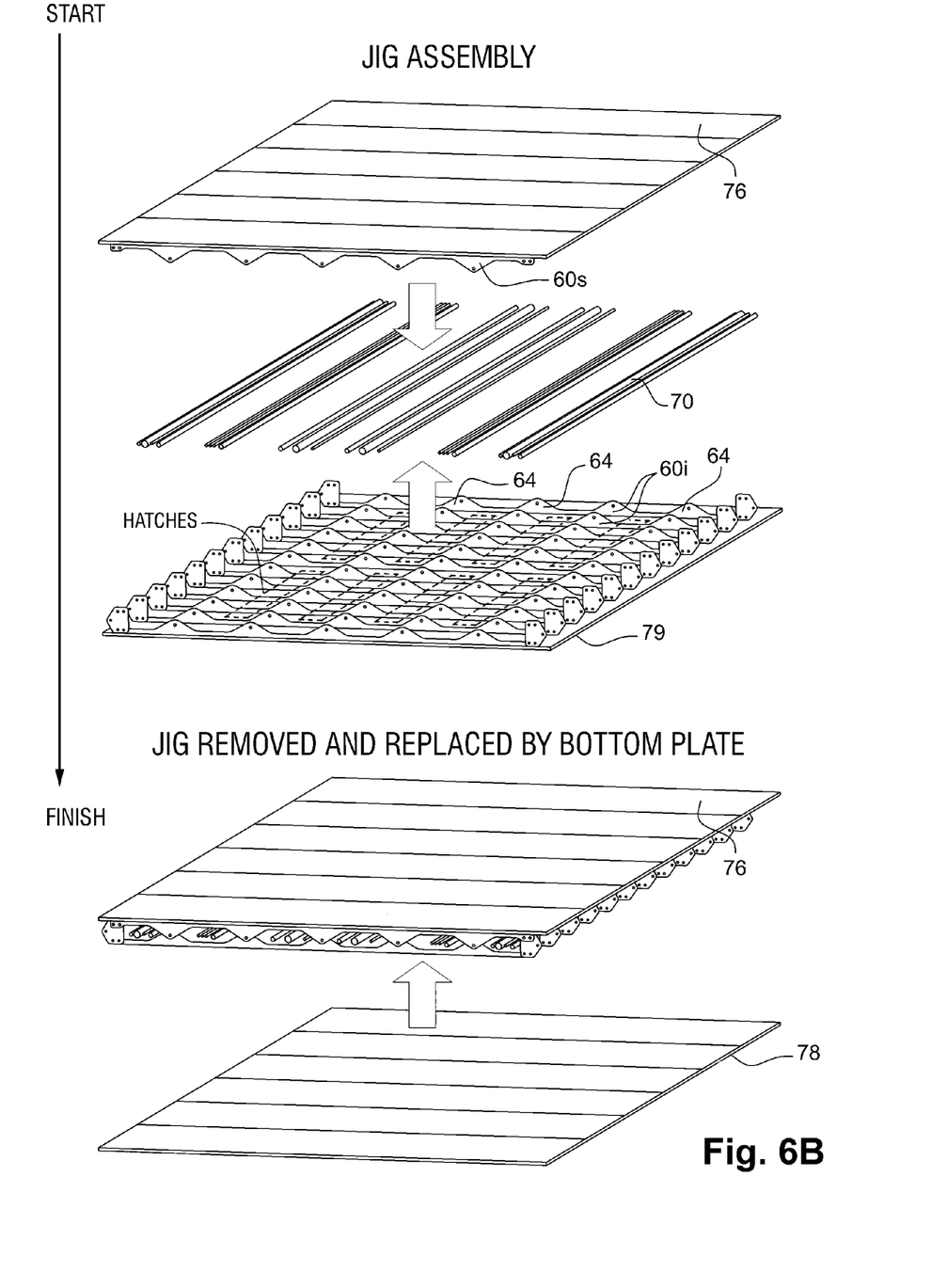

FIG. 6B shows a configuration similar to FIG. 6A, but where the jig can be removed and replaced by the bottom plate.

With reference to FIG. 7, the middle portion 58m is inserted in the fuselage segment. At this stage, the segment may already have its top portion closed, as shown in the figure, with insertion then taking place along the horizontal direction X. Once the middle portion has been received in position in register with the lateral portions 58l, it is fastened thereto by means of fasteners 72. This fastening may be performed at this stage without performing any drilling operations, where such operations are considered as being polluting for the members situated in the environment in which they are performed.

In a variant, provision may be made during construction of the middle portion 58m to constitute the bottom subassembly with the bottom partial crossmembers 60i and the bottom panel 78 for the purpose of making the sandwich, rather than using an assembly jig. Under such circumstances, one or more access hatches are provided through the bottom panel 78 so as to allow the pins 66 to be put into place.

Provision could also be made to replace such hinges with mutual engagements that fasten the top partial crossmembers to the bottom partial crossmembers as soon as they are positioned relative to one another in their final relative position.

For example, the middle portion may have a total height of 182 millimeters (mm). The gaps 68 may have a height of 100 mm, for example.

With reference to FIG. 1, the airplane 2 has a plurality of rows of passenger seats 84. The rows are parallel to the direction Y and they are disposed one behind another. In the present example, the airplane has a central aisle 86 intersecting the vertical longitudinal midplane of the fuselage. Specifically, each row has the same number of seats on either side of the aisle. In this example, there are three seats on the left and three seats on the right. The seats 84 in a row are mutually identical. Each of them has a seat back 88 and a seat proper 90.

Figure 2:
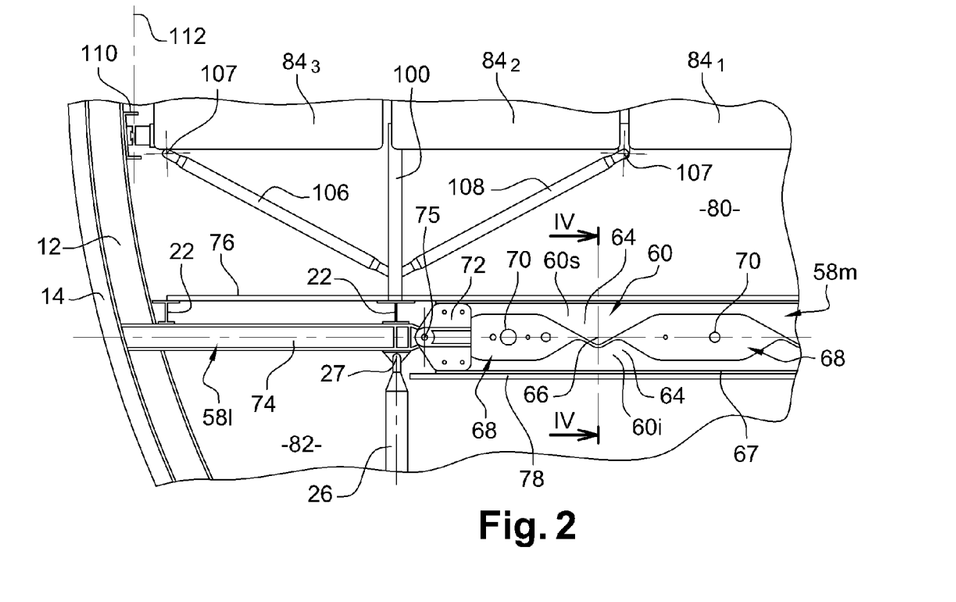
FIG. 2 is a fragmentary view on a larger scale of a portion of the FIG. 1 fuselage.
Figure 3:
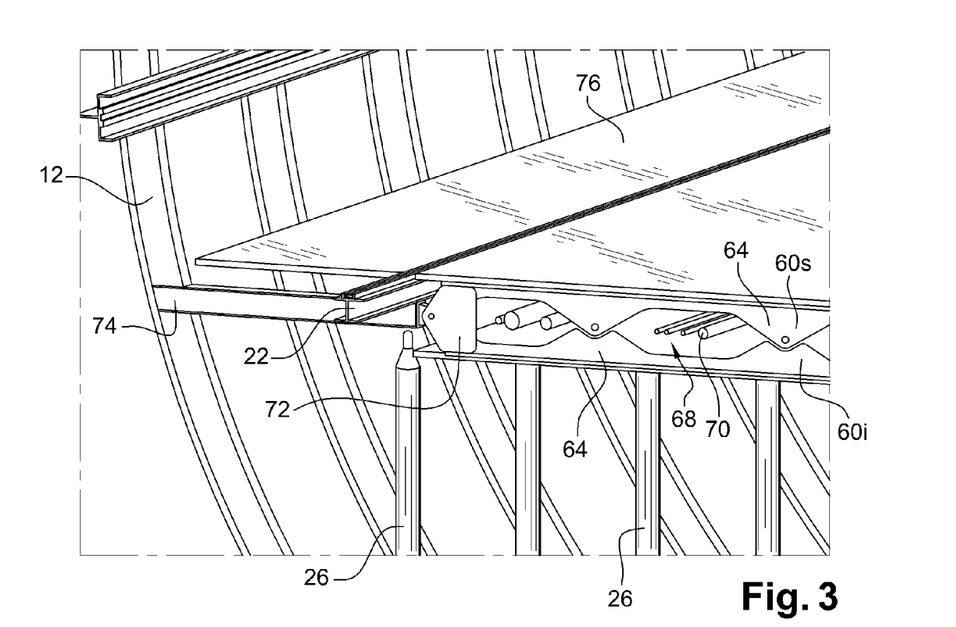
FIG. 3 is a perspective view of the FIG. 2 fuselage portion.
Figure 8:
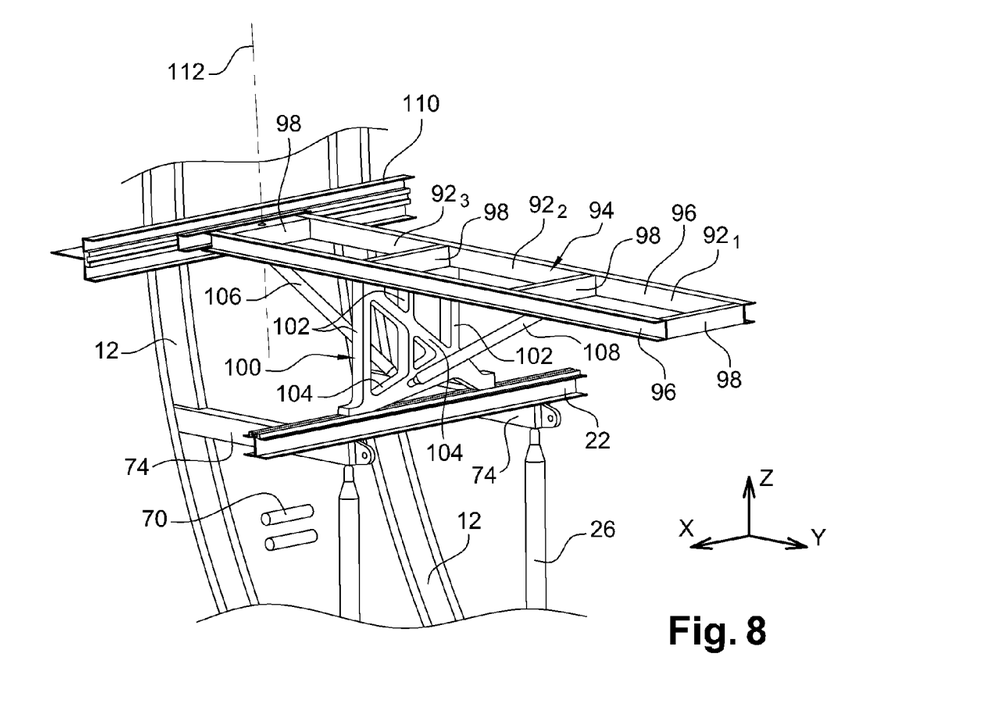
FIG. 8 is a perspective view of the FIG. 1 fuselage, showing the seat supports.

With reference to FIG. 2 and FIG. 8, the seats of the row are associated with respective supports $92_1$, $92_2$, and $92_3$, each support fully supporting the corresponding seat. For convenience, the seats of the row corresponding to the respective supports $92_1$, $92_2$, and $92_3$ are given respective references, going from the aisle, of $84_1$, $84_2$, and $84_3$. Each support is formed by a rectangular frame extending in a horizontal plane. A seat is fastened via its seat proper to the corresponding support. In each row, the three supports $92_1$, $92_2$, and $92_3$ for the seats situated on one side of the aisle constitute a single part or base 94. The base comprises two spars 96 extending in the direction Y and four ribs 98 extending in the direction X. The two end ribs are located at the ends of the spars. The other two ribs are disposed respectively one-third and two-thirds of the way along them. Each support is defined by two of the ribs and by portions of both spars.

The base 94 is connected to the floor independently of the fuselage via a single leg 100 that is rigidly fastened to the base and that extends in a plane parallel to the directions X and Y. The leg extends at the junction between the two supports $92_2$ and $92_3$ that are the closest to the fuselage and the furthest from the aisle 86. The leg 100 extends in register with the rib 98 common to the supports $92_2$ and $92_3$. The leg 100 comprises three vertical uprights 102 and two ribs 104 that are inclined relative to the vertical direction. The leg 100 defines a front leg zone and a rear leg zone via each of which it bears directly on the floor. The leg is fastened directly to the rail 22 that bears on the battens 74. In this example, the leg lies in the same vertical plane as the posts 26 supporting the ends of the battens.

Two braces 106 and 108 connect the supports 92 to the bottom portion of the leg 100. One of the braces 106 extends from the rib 98 closest to the fuselage down to the leg. The other brace 108 extends from the rib 98 situated at the junction between the supports $92_1$ and $92_2$ down to the leg. Each of the braces is connected to the other parts via its ends by means of respective hinge connections about pins 107 parallel to the axis X. Both braces 106 and 108 extend in a common plane perpendicular to the direction X and situated halfway between the two spars 96.

The base is also fastened to the fuselage via a rail 110 parallel to the direction X and fastened directly to a plurality of the frames 12, being situated level with the base, the rail extending the base in the direction Y. Specifically, the base 94 is hinged to the rail 110 about a vertical pin 112.

It can thus be seen that the support $92_1$ of the seat adjacent to the aisle 86 is connected to the fuselage solely via the support $92_2$ of the adjacent seat in the row. In other words, it is the support $92_2$ that provides the entire support for the support $92_1$ and its seat $84_1$. The seats $84_1$ and $84_2$ are supported together in a cantilevered configuration. Independently of the hinge fastening to the fuselage, all three seats and their supports are supported by the floor via the single leg 100.

Such an arrangement serves to release the middle zone of the floor 58m from the loads that are transmitted by the seats. This is already advantageous when the floor is made as a single piece. However, in the present configuration, it can be understood that the entire middle portion 58m of the floor is relieved of any load transmitted by the seats, in particular in the event of a crash. Fastening the seat to the fuselage via the floor takes place only in the lateral portions 58l. There is thus no need to provide means in the middle portion for taking up the forces transmitted by the seats.

In addition, in the event of a crash, the loads generated by the seats are transmitted directly by the leg to the posts 26 and to the frames 12. At the end of the row remote from the aisle, transmission via the rail 110 also takes place directly to the frames 12.

In addition, fastening the middle portion 58m to the lateral portion 58l remains particularly simple since there is no need to fasten the middle portion to the seats, or vice versa.

Figure 9:
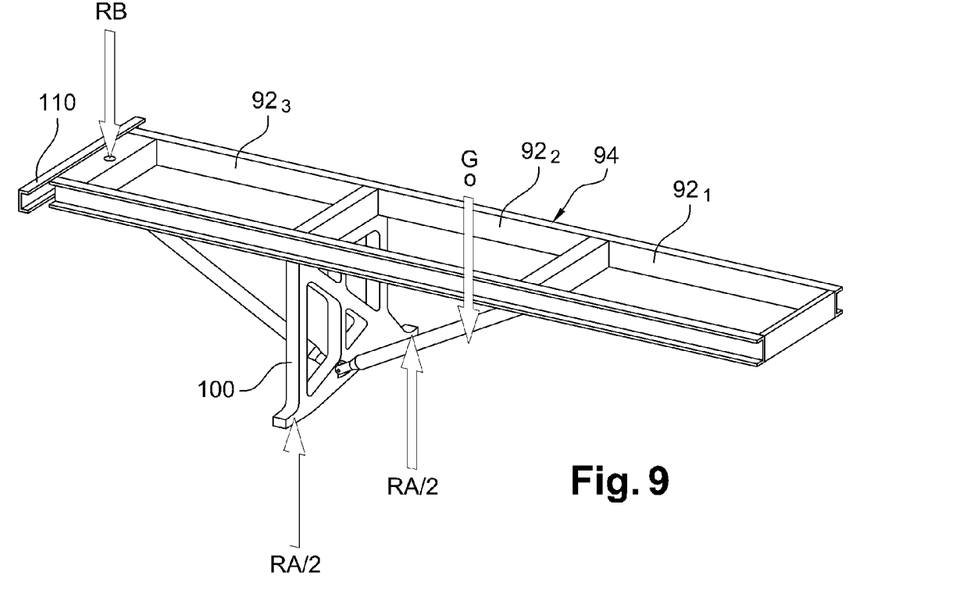
FIGS. 9 and 10 are perspective views of seat supports showing Forced Diagrams for two stress-loading circumstances.

FIG. 9 illustrates a situation in which a force G, e.g. of magnitude equal to six times gravity, is applied in the vertical direction downwards on the support $92_2$. This stimulates the force transmitted via the seats by the passengers in the event of the airplane impacting the ground vertically. This force acts above the plane of the support $92_2$. This force is balanced:

firstly by an upward vertical reaction RA transmitted by the fuselage to the leg 100, and more precisely two vertical reactions RA/2 transmitted to the ends of the leg; and secondly by a downward vertical reaction RB transmitted by the rail 110 to the end of the base.

Figure 10:
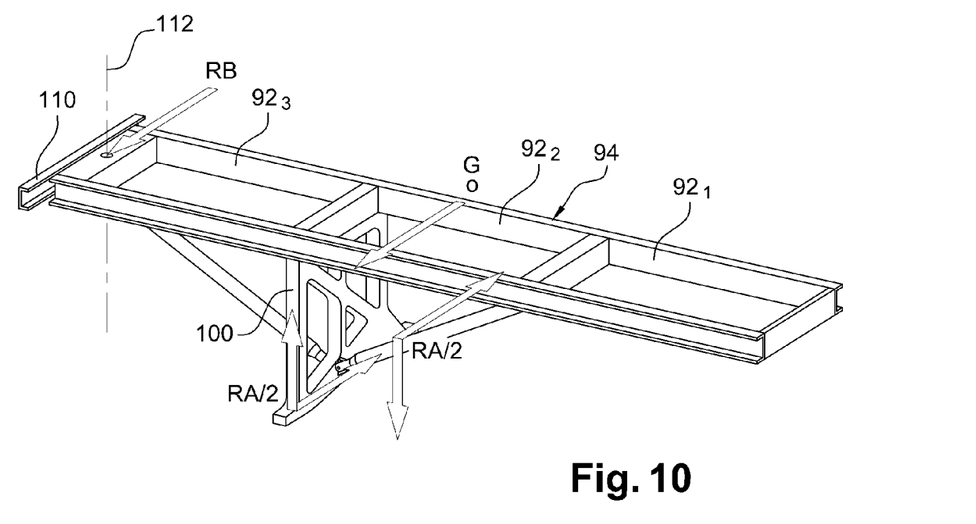

FIG. 10 illustrates another situation in which a force G, e.g. of magnitude equal to nine times gravity, is applied in the forward horizontal direction to the same point as in the preceding figure. This simulates a front impact.

This force gives rise to two reactions RA/2 at both bottom ends of the leg 100. Each of these reactions extends in the vertical plane of the leg and comprises a horizontal component extending rearwards and a vertical component extending upwards at the front and downwards at the rear. The force G also gives rise to a forward horizontal reaction RB transmitted by the rail 110 to the end of the base. In the absence of the hinge pin 112, reaction forces from the rail 110 to the base 94 would appear that extend in the direction Y. Fastening the base rigidly to the rail would, on impact, give rise to a bending moment about a vertical axis. Unfortunately, in the presence of an assembly that is highly statically undetermined, such stresses are difficult to quantify, thereby complicate the design of the parts. The hinge makes the assembly isostatic in a horizontal plane and therefore simplifies design. Nevertheless, this hinge is optional.

The parts constituting the fuselage, the floor, and the seat supports may be made of metal.

Naturally, numerous modifications may be applied to the invention without going beyond the ambit thereof.

Provision could be made for the top partial crossmembers 60 to be fastened to an assembly jig on a temporary basis. Similarly, provision could be made for the access hatch(es) to be provided in the top panel 76.

Provision may be made for only the seat that is adjacent to the aisle to be cantilevered out.

What is claimed is:

1. An aircraft floor section comprising:
    an upper floor panel;
    a plurality of upper partial cross members fastened to a lower face of the upper floor panel;
    a lower floor panel;
    a plurality of lower partial cross members fastened to an upper face of the lower floor panel;
    wherein each upper partial cross member is connected to a corresponding lower partial cross member to form a full cross member;
    wherein each full cross member comprises at least one gap between the connected upper and lower partial cross members; and
    at least one utility element extending substantially perpendicular to the plurality of full cross members and located within the at least one gap therein;
    wherein the at least one utility element is configured to provide air, water, refrigeration, electrical, communications, or fire extinguishing services.

2. The aircraft floor section according to claim 1, wherein each respective upper and lower partial cross member pair are connected by at least two hinges.

3. An aircraft comprising the aircraft floor section according to claim 1.

4. An aircraft fuselage comprising:
  two lateral floor sections fastened to opposite side walls of the fuselage and extending along a length thereof;
  a plurality of vertical supports connected to the fuselage and the lateral floor section;
  a central floor section comprising the aircraft floor section of claim 1, extending along a length of the fuselage and between the two lateral floor sections;
  wherein the central floor section is fastened respectively on each side to one of the two lateral floor sections.

5. A method of making an aircraft floor section comprising the steps of:
  providing an upper floor panel;
  fastening a plurality of upper partial cross members to a lower surface of an upper floor panel to form a first subassembly;
  providing a lower floor panel comprising a plurality of access hatches or openings therein;
  fastening a plurality of lower partial cross members to an upper surface of a lower floor panel to form a second subassembly;
  locating at least one utility member, configured to provide air, water, refrigeration, electrical, communications, or fire extinguishing services, between the first and second subassemblies such that the at least one utility member extends in a direction substantially perpendicular to the partial cross members;
  moving the first and second subassemblies together in a vertical direction to form a stack with the at least one utility member sandwiched in-between;
  connecting each of the plurality of upper partial cross members with a corresponding lower partial cross member via the access hatches or opening;
  wherein each of the plurality of connected upper and lower partial cross members form a full cross member comprising at least one gap for receiving the at least one utility member.

6. The method of making an aircraft floor section according to claim 5, wherein each respective pair of upper and lower partial cross members is connected together by at least two hinges.

7. A method of making an aircraft having an aircraft floor comprising:
  providing an aircraft fuselage;
  providing two lateral floor sections extending along a length of the fuselage;
  fastening the two lateral floor sections to opposite side walls of the fuselage;
  fastening a plurality vertical supports to the fuselage at one end and to the lateral floor sections at the opposite end;
  providing a central floor section made in accordance with the method of claim 5;
  locating the central floor section such that it extends along a length of the fuselage and in-between the two lateral floor sections;
  fastening the central floor section on each side respectively to one of the two lateral floor sections.

8. The method of making an aircraft having an aircraft floor according to claim 7, wherein prior to the step of locating the central floor section between the lateral floor sections, additional systems are located in triangular areas located between the lateral floor sections and the vertical supports on each side of the fuselage.

9. The method of making an aircraft having an aircraft floor according to claim 7, wherein the central floor section is inserted through an end of the fuselage and into place between the lateral floor sections.

10. A method of making an aircraft floor section comprising the steps of:
  providing an upper floor panel;
  fastening a plurality of upper partial cross members to a lower surface an upper floor panel to form a first subassembly;
  providing a jig comprising a plurality of access hatches or openings therein;
  fastening a plurality of lower partial cross members to an upper surface of the jig to form a second subassembly;
  locating at least one utility member, configured to provide air, water, refrigeration, electrical, communications, or fire extinguishing services, between the first and second subassemblies such that the at least one utility member extends in a direction substantially perpendicular to the partial cross members;
  moving the first and second subassemblies together in a vertical direction to form a stack with the at least one utility member sandwiched in-between;
  connecting each of the plurality of upper partial cross members with a corresponding lower partial cross member via the access hatches or opening;
  wherein each of the plurality of connected upper and lower partial cross members form a full cross member comprising at least one gap for receiving the at least one utility member;
  removing the jig from the plurality of lower partial cross members; and fastening a lower floor panel to the plurality of lower partial cross members.

11. The method of making an aircraft floor section according to claim 10, wherein each respective pair of upper and lower partial cross members is connected together by at least two hinges.

12. A method of making an aircraft having an aircraft floor comprising:
  providing an aircraft fuselage;
  providing two lateral floor sections extending along a length of the fuselage;
  fastening the two lateral floor sections to opposite side walls of the fuselage;
  fastening a plurality vertical supports to the fuselage at one end and to the lateral floor sections at the opposite end;
  providing a central floor section made in accordance with the method of claim 10;
  locating the central floor section such that it extends along a length of the fuselage and in-between the two lateral floor sections;
  fastening the central floor section on each side respectively to one of the two lateral floor sections.

13. The method of making an aircraft having an aircraft floor according to claim 12, wherein prior to the step of locating the central floor section between the lateral floor sections, additional systems are located in triangular areas located between the lateral floor sections and the vertical supports.

14. The method of making an aircraft having an aircraft floor according to claim 12, wherein the central floor section is inserted through an end of the fuselage and into place between the lateral floor sections.

* * * * *